United States Patent [19]

McCullough, Jr. et al.

[11] Patent Number: 4,886,715
[45] Date of Patent: Dec. 12, 1989

[54] MOLTEN MEMBRANE ELECTROLYTE BATTERY

[75] Inventors: Francis P. McCullough, Jr.; Robert A. Cipriano, both of Lake Jackson; R. Vernon Snelgrove, Damon, all of Tex.

[73] Assignee: The Dow Chemical Company, Midland, Mich.

[21] Appl. No.: 250,789

[22] Filed: Sep. 28, 1988

Related U.S. Application Data

[63] Continuation-in-part of Ser. No. 4,003, Jan. 16, 1987, abandoned, and a continuation-in-part of Ser. No. 3,974, Jan. 16, 1987, abandoned.

[51] Int. Cl.$^4$ .............................................. H01M 6/20
[52] U.S. Cl. .................................... 429/103; 429/112; 429/198
[58] Field of Search ............... 429/102, 103, 101, 104, 429/192, 249, 112, 198, 218

[56] References Cited

U.S. PATENT DOCUMENTS

| | | | |
|---|---|---|---|
| 3,428,493 | 2/1969 | Adams | 429/112 |
| 3,847,667 | 11/1974 | Werth | 429/103 |
| 3,870,561 | 3/1975 | Charbonnier et al. | 429/102 |
| 4,005,183 | 1/1977 | Singer | 423/447.2 |
| 4,285,831 | 8/1981 | Yoshida et al. | 423/447.2 |
| 4,539,277 | 9/1985 | Ishigaki et al. | 429/249 |
| 4,592,973 | 6/1986 | Pemsler et al. | 429/249 X |
| 4,631,118 | 12/1986 | McCullough et al. | 204/16 |
| 4,707,423 | 11/1987 | Kalnin et al. | 429/112 |

Primary Examiner—Anthony Skapars

[57] ABSTRACT

A primary rechargeable electrical energy storage device comprising a housing having an electrically nonconductive interior surface, at least one cell positioned in said housing, each cell comprising an anode consisting of a low melting metal selected from the group consisting of alkali metal, alkali metal alloy and alkali metal eutectic mixture, a separator surrounding said anode, said separator being capable of transporting ionic species and electrically isolating said anode, a cathode comprising a carbonaceous graphite cloth, and a non-aqueous electrolyte.

11 Claims, 1 Drawing Sheet

MOLTEN MEMBRANE ELECTROLYTE BATTERY

RELATED APPLICATION

This application is a continuation-in-part of application Ser. No. 004,003 filed Jan. 16, 1987 and Ser. No. 003,974 filed Jan. 16, 1987, of McCullough et al, both now abandoned.

FIELD OF THE INVENTION

The present invention relates to a primary rechargeable energy storage device. More particularly, the invention is concerned with an energy storage device having an anode comprising a molten alkaline earth or alkali metal, a carbonaceous fiber cathode and a membrane electrolyte having improved freeze-thaw capabilities.

BACKGROUND OF THE INVENTION

The combination of relatively high theoretical energy density, potentially long life, and low cost materials such as reported in the sodium-sulfur system high temperature batteries has been reported in the literature as suitable for low rate performance work such as electric road vehicle propulsion or load leveling of electric power supplies. The sodium-sulfur systems, first proposed in 1966, has had a great deal of effort expended in trying to develop a practical system. The basic operating principle involves the separation of two active molten materials, sodium and sulfur, by either a ceramic membrane of beta alumina or sodium glass, which at about 300° C. or higher allows the passage of sodium ions that form with the sulfur any of the several polysulfides. The open circuit voltage of the system is at just over 2 volts, about the same as the lead-acid cell. Two formidable problems exist at the present time, viz., cracking of the separator and corrosion of the casing and seal.

Another somewhat similar system is the lithium-iron sulfide system, operating at about 450° C. However, insufficient development has been done to date to demonstrate the widespread practicality of this system.

Another of the developments being pursued involves a lithium-based cell, in which the negative electrode is a lithium alloy (typically either lithium-aluminum or lithium-silicon), the positive electrode is an iron sulfide, and the electrolyte is a molten salt, such as the eutectic composition in the lithium chloride-potassium chloride system. Because of the high melting point of such salts, such cells must be operated in the temperature range of 400–500 degrees centigrade.

This requirement to operate at such high temperatures has several important disadvantages. One of these is that various degradation processes, such as corrosion of the cell container, seals, and other components are accelerated by such high temperatures. Another is that a substantial amount of energy is lost through heat transfer to the surroundings. Still another is that the voltage obtained from such cells is lower at elevated temperatures, due to the fundamental property of the negative temperature dependence of the free energy of the cell reaction. Furthermore, the higher the temperature of operation, the greater the potential problems related to damage to the cell during cooling to ambient temperature and reheating, whether deliberate or inadvertent. Differences in thermal expansion, as well as dimensional changes accompanying phase changes, such as the freezing of the molten salt, can cause severe mechanical distortions, and therefore damage to cell components.

Cells involving a lower temperature molten salt electrolyte have been investigated where the molten salt is based upon a solution of aluminum chloride and an alkali metal chlride. However, such salts are not stable in the presence of the respective alkali metals. As a result, an auxiliary solid electrolyte must be used to separate the alkali metal and the salt. One example of such a cell involves a molten sodium negative electrode, a solid electrolyte of sodium beta alumina, a molten aluminum chloride-sodium chloride salt, and either antimony chloride or an oxychloride dissolved in the chloride salt as the positive electrode reactant.

Such a cell can operate in the temperature range 150–250 degrees centigrade. It has the disadvantage of having to employ an electrolyte, which increases the cell impedance, as well as adding to the cost and complexity.

U.S. Pat. No. 3,844,837 to Bennion et al discloses a nonaqueous battery in which the anode may be lithium and/or graphite on which lithium metal is deposited and as a positive electrode a platinum cup filled with powdered $K_2SO_4$ and graphite is utilized. The electrolytes disclosed are $LiClO_4$, $LiCF_3SO_3$ or $LiBF_4$ dissolved in dimethyl sulfite.

SUMMARY OF THE INVENTION

In the *Encyclopedia of Chemical Technology*, Kirk-Othmer, Vol. 14, Third Edition, pages 464–465, there is disclosed the preparation of lithium nitride by the judicious admission of nitrogen gas to lithium metal. This technique can be utilized in the present invention to form the lithium nitride coated lithium electrode.

In *Chemical Abstract*, Vol. 102, 1985, 135990z there is mentioned the use of a press-formed layer of $Li_3N$ on a lithium electrode in combination with a polymeric electrolyte.

The article of Alpen et al entitled "Ionic Conductivity in $Li_3N$ Single Crystals", *Appl. Phys. Lett.*, Vol. 30, No. 12, 15 June 1977, pages 621–623, disclosed a lithium electrode and a chromium electrode in combination with lithium nitride crystals. The lithium is disclosed as being pasted on the lithium nitride and the chromium is sputtered on the lithium nitride.

In accordance with the present invention there is provided a primary-rechargeable storage device having a moisture impervious sealable housing and at least one cell positioned in the housing. The cell comprises a pair of electroconductive electrodes electrically insulated from contact and a substantially non-aqueous membrane electrolyte.

A carbonaceous electrically conductive fibrous material intimately associated with a current collector frame-like member forms an assembly which is referred to as the cathode or positive electrode. The anode or negative electrode is an alkaline earth or alkali metal, exemplified by calcium, potassium, strontium, lithium and sodium, as well as low melting alloys and/or alkali eutectic mixtures thereof which contain the aforesaid alkali metals as the predominate constituent. Preferable of the eutectic mixtures are the lithium containing eutectics of Ca, Si, K, Ba, Ag, Zn and Al. The melting point of lithium is about 175° C. to 180° C.

A separator encapsulates the anode. The separator must be capable of transporting or passing ionic species, e.g., alkaline earth or alkali metal ions and electrically isolating the anode from the cathode. The encapsulated anode electrode is positioned within a housing which is capable of containing the metal anode in its molten state and is at least moisture impervious, and preferably at least partially electrically conductive.

The electrolyte is a molten membrane-forming salt preferably, the electrolyte comprises a lithium salt such as lithium laurate which forms a thin film electrolyte. However, other salts may be utilized, for example, lithium fluoroborate in ethylene carbonate, the eutectic composition of a lithium chloride-potassium chloride system, etc. Such other salts because of their high melting points require the cells to operate at high temperatures, that is, about 400° C.-500° C.

The electroconductive carbonaceous material is more fully described in copending application Ser. No. 558,239, entitled Energy Storage Device, filed Dec. 15, 1983 and Ser. No. 678,186, entitled Secondary Electrical Energy Storage Device and an Electrode Therefore, filed Dec. 4, 1984, each by F. P. McCullough and A. F. Beale, which applications are incorporated herein by reference in their entirety. Simply, the preferred carbonaceous material is a fiber spun from stabilized polymeric material such as pitch based material or polyacrylonitrile based fibers. These fibers are sabilized by oxidation and thereafter made electroconductive by carbonization at temperatures of above 850° C., and preferably above 1700° C. Preferably, the carbonaceous fibers have a Young's Modulus of greater than about one million psi, and preferably about five million psi. The upper limit for practical manufacturing is about 100 million psi, although as production techniques improve it may be possible to use a material which has a higher Young's Modulus. However, such material is at present considered to be much too brittle to withstand manufacture into electrodes, as well as, the rigors of use to which a battery may be subjected. The carbonaceous material should have sufficient strength to withstand the encapsulation without loss of electrical contact between the carbon particles. Thus, one can employ a carbonaceous material defined in the foregoing application as well as many other forms of electroconductive carbons such as GRAFOIL when they are encapsulated in the manner hereinafter described or activated carbon fibers.

The separator may be carbonaceous fibers or a non-conductively coated metallic screen of metals which include stainless steel, silver, platinum, etc., for example having a coating of $Li_3N$ or a cationic polymer stable in the environment of use. Suitable polymers include, but are not limited to, the functionalized fluorocarbon polymers. Thus, one can employ a fluorocarbon based polymer such as NAFION sold by the DuPont Corporation which is a persulfonic acid membrane.

The positive electrode, when constructed as a cloth or sheet, includes an electron collector conductively associated with the carbonaceous fibers or sheet. The electrode conductor interface is preferably further protected by a material to insulate the collector and to substantially protect the electron collector from contact with the fluid electrolyte and its ions. The protective material must, of course, be unaffected by the electrolyte and its ions.

It is also envisioned that the electrode may be constructed in other shapes such as in the form of a cylindrical or tubular bundle of fibers. It is also apparent that an electrode in the form of a planar body of cloth, sheet or felt can be rolled up with a separator between the layers of the carbonaceous material, and with the opposed edges of the rolled up material, connected to a current collector. While copper metal has been used as a current collector, any electro-conductive metal or alloy may be employed, such as, for example, silver, gold, platinum, cobalt, palladium, and alloys thereof. Likewise, while electrodeposition has been used in bonding a metal or metal alloy to the carbonaceous material, other coating techniques (including melt applications) or electroless deposition methods may be employed.

Collectors made from a non-noble metal, such as copper, nickel, silver or alloys of such metals, must be protected from the electrolyte and therefore are preferably coated with a synthetic resinous material or an oxide, fluoride or the like which will not be attacked by the electrolyte or undergo any significant degradation under the operating conditions of a cell.

Suitable techniques for preparing the collector/carbonaceous material negative electrode are more fully described in co-pending application Ser. No. 729,702, entitled Improved Low Resistance Collector Frame for Electro-conductive Organic and Graphitic Materials, filed May 2, 1985, by F. P. McCullough and R. V. Snelgrove.

BRIEF DESCRIPTION OF THE DRAWING

The present invention will be better understood from the following description of preferred embodiments of the invention together with the accompanying drawings wherein.

DETAILED DESCRIPTION OF THE INVENTION

Figure 1:
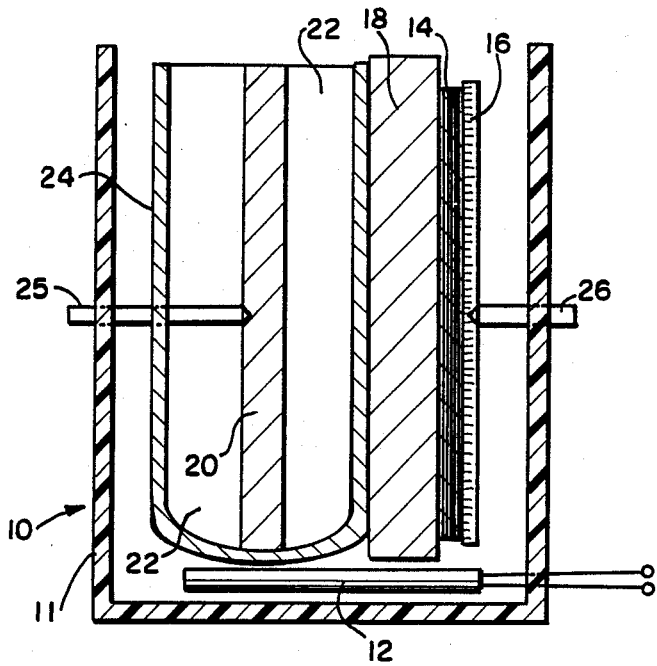
FIG. 1 is a schematic side elevational view, in cross-section, of an embodiment of the invention.

Referring to FIG. 1, a cell 10 within a housing 11 includes an anode assembly comprising an expanded metal matrix 20 in which lithium 22 in the liquid state is retained.

A separator 24 encloses the anode assembly with a connector 25 passing through the separator 24 for connection to the anode. The separator 24 preferably comprises a cationic polymer, $Li_3N$ on a metallic screen, for example a carbon steel screen.

The cathode comprises a graphite cloth 16 that is placed adjacent a connector 26, which is preferably aluminum. The cloth advantageously has a bulk density which is normally expected for carbon fibers. Also included is a suitable membrane electrolyte which preferably is a lithium salt.

In order to bring the battery to its operating temperature when lithium is the anode material, which preferably is about 200° C. to 300° C., there is provided a heater 12.

Figure 2:
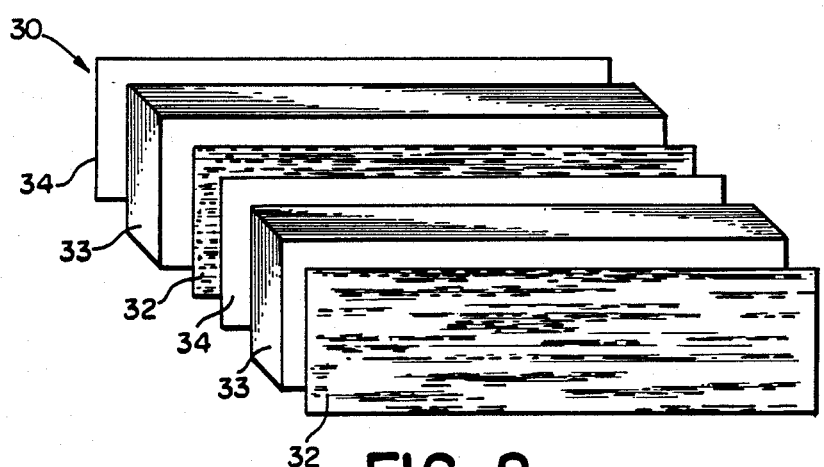
FIG. 2 is a partially broken away view of a flat plate multi-cell bipolar battery of the invention.

In order to keep the internal resistance and the battery weight low, the battery 30 comprising bipolar thin plates as shown in FIG. 2. FIG. 2 illustrates a multi-cell assembly 30 showing two series connected cells separated by a bipolar plate connector 32 which is a 0.003" thick aluminum. The density of the aluminum is about 2.7 g/cc. It is to be understood that the assembly 30 can include any number of cell units by use of additional bipolar separators and cell units. The assembly 30 includes cathode and anode plates 33 and 34. The anode 34 comprises a stainless steel screen containing 2.5 times the stoichrometric amount of lithium metal and is coated with a film of Li$_3$N.

The cathode plate 33 comprises a 0.08 cm thick graphite cloth electrode having a bulk density of about 0.645 g/cc and lithium laurate comprises the electrolyte.

It is understood that the units are physically bonded to each other so as to become a unitary structure.

Energy devices which are contained in fluid-tight housings are generally known in the art. Such housings may be suitably employed in the present invention as long as the housing material is preferably electrically non-conductive or at least insulated from contact with one electrode and is impervious to gases and/or moisture (water or water vapor).

Housing materials which may be utilized are the conventional housing systems for high temperature batteries which include metallic, ceramic, and composites of the two groups, and the like.

In addition to being compatible, a housing material may also offer an absolute barrier (less than about 0.2 grams of H$_2$O/yr/ft$^2$ or 0.02 grams of H$_2$O/yr/m$^2$) against the transmission of water vapor from the external environment of the housing in order to prolong life. No presently known thermoplastic materials alone offers this absolute barrier against moisture at a thickness which would be useful for a battery housing. At present only metals, for example aluminum or mild steel, offer an absolute barrier against moisture at foil thicknesses. Aluminum foil having a thickness of greater than 0.0015 in. (0.038 mm) has been shown to be essentially impervious to water vapor transmission. It has also been shown that when laminated to other materials, aluminum foil as thin as 0.00035 in. (0.009 mm) can provide adequate protection against water vapor transmission. Suitable housings made of metal-plastic laminate, CED-epoxy-coated metal (cathodic electro deposited), or metal with an internal liner of plastic or glass presently satisfies the requirements for both chemical compatability and moisture barrier ability. Most of the cells and batteries built to date have been tested in either a dry box having a H$_2$O level of 5 ppm, a glass cell or a double walled housing with the space between the walls filled with an activated molecular sieve, e.g. 5A zeolite.

The following examples are beaker cell experiments to demonstrate the principles of the present invention.

EXAMPLE 1

A single strand of yarn taken from a woven Panex PWB-6 cloth which had been stabilized, woven and carbonized by the manufacturer was pressed between two sheets of a sulfonyl fluoride form of a fluorinated polymeric membrane material under about ½ ton pressure. This laminate was hydrolyzed with an aqueous 20% sodium hydroxide solution for 24 hours at 90° C. The so hydrolyzed laminate was dried at 100° C. under 20 inches of vacuum for 48 hours, then placed in an evacuatable anti-chamber of an argon filled glove-box maintained under 30 inches vacuum at 50° C. for 48 hours. Thereafter a cell was assembled in the dry box by placing the laminate into molten lithium contained in a nickel crucible over a 180° C. hot plate. The laminate was held under the surface of the molten lithium by a small insulated clamp. A pair of alligator clips were attached one to the assembly and the other to the crucible. An open current voltage of 2.5 volts was measured. A micro amp current flowed for several minutes. The membrane laminate was removed from the molten lithium in order to examine the surface of the membrane. Visual examination showed the membrane surface slightly etched, but showed no significant degradation.

Over 30 freeze-thaw experiments were performed with no loss of capacity. The cell, frozen at partial state of charge, retains that capacity until reheated and discharged.

The electrode reactions in the battery of the invention are:

Anode: 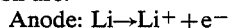
Cathode: 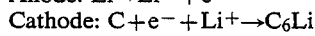

Voltage of the cell couple generally varies from 2.56 V at C+Li to 2.26 V as the cell discharges to a cathode composition of C$_6$Li.

Lithium metal pressed into an expanded metal mesh is used for the preferred batteries of the invention. The graphite fiber electrode, in the form of woven graphite cloth is preferably prepared as disclosed in application Ser. No. 678,186.

EXAMPLE 2

A single strand of carbon fiber yarn was taken from a woven Panex PWB6 cloth (manufactured by Stackpole). This woven cloth was reported to have been heat treated to about 1500° C. by Stackpole. This single strand of carbon fiber yarn was immersed in a steel crucible containing a molten salt electrolyte and a lithium salt of lauric acid. A steel mesh screen of a pore size that the molten lithium would not pass through was filled with molten lithium to provide a negative electrode and inserted into the container. The screen was centered within the container to provide a concentric construction. The carbonaceous electrode was provided with an insulation coated copper wire attached to one end of the negative electrode which extended above the molten electrolyte. The molten lithium contacted the metal container to which a second insulated wire was attached.

The cell was assembled in the dry box. A pair of alligator clips were attached. One was attached to the insulated wire attached to the carbonaceous electrode assembly and the other was attached to the crucible. An open current voltage of 2.56 volts was measured. A microamp current flowed for several minutes.

EXAMPLE 3

A low carbon steel wire mesh screen was wrapped around a one-half inch in diameter cylindrical rod joined at its edge by a double crimp and at its bottom end in a like manner crimped, thereby to form a cylindrical element. This element was inserted into a one inch crucible which was provided with a Teflon liner. Small pieces of lithium were inserted into the wire mesh basket and melted in place until the wire mesh tube was filled. A piece of woven Panex PWB6 staple yarn was copper plated on one edge, wrapped about a three quarter inch diameter mandrel and the resulting tube inserted between the Teflon liner and the wire mesh tube. A quantity of the lithium salt of lauric acid liquid was poured into the lined crucible filling the space between the liner and the cylindrical element, immersing the negative electrode therein. A small piece of brass rod was inserted into the molten lithium to act as a conductor and a small copper wire was soldered to the copper plate of the carbon electrode, acting as the other lead. An open circuit voltage of about 2.5 volts was measured across the leads. The cell was capable of producing current in the microamp range at a steady voltage for several days. The cell was freeze/thawed at least 5 times without any adverse effects.

While the number of specific embodiments of this invention had been shown and described above, it will, of course, be understood that the invention is not limited thereto since many modifications both in the structure and the arrangement instrumentalities employed therein may be made. It is contemplated by the appended claims to cover any such modification which fall within the true scope and spirit of this invention.

What is claimed is:

1. A primary rechargeable electrical energy storage device comprising a housing having an electrically nonconductive interior surface, at least one cell positioned in said housing, each cell comprising an anode consisting of a low melting metal selected from the group consisting of alkaline earth metal, alkaline earth metal alloys, alkali metal, alkali metal alloy and alkali metal eutectic mixtures thereof, a separator surrounding said anode, said separator being capable of transporting or passing ionic species and electrically isolating said anode, a cathode comprising a carbonaceous fibrous structure, and a non-aqueous lithium laurate membrane electrolyte associated with said cathode.

2. The electrical storage device of claim 1 including a current collector in contact with said cathode.

3. The electrical storage device of claim 2 wherein said current collector is comprised of metal.

4. The electrical storage device of claim 3 wherein said current collector is polymeric.

5. The electrical storage device of claim 1 wherein said anode comprises an alkali metal.

6. The electrical storage device of claim 5 wherein said alkali metal is lithium or sodium.

7. The electrical storage device of claim 1 wherein said cathode comprises a graphite fabric.

8. The electrical storage device of claim 7 wherein said separator is a cationic polymer.

9. The electrical storage device of claim 8 wherein said cationic polymer is a fluorocarbon based polymer.

10. The electrical storage device of claim 1 including heating means.

11. In a primary rechargeable electrical energy storage device operable at a temperature above 180° C. comprising a housing having an electrically non-conductive interior surface, at least one cell positioned in said housing, each cell comprising a pair of electroconductive electrodes electrically insulated from contact, said housing containing a non-aqueous electrolyte salt the improvement comprising that negative electrode of each cell is lithium coated with $Li_3N$, the positive electrode is a graphite cloth having a Young's Modulus greater than one million psi and the electrolyte is lithium laurate.

* * * * *